Feb. 24, 1931.  T. M. CONDON  1,793,777
GASOLINE RELEASING DEVICE FOR AEROPLANES
Filed Sept. 28, 1929    2 Sheets-Sheet 1

INVENTOR.
T. M. CONDON.
BY HIS ATTORNEYS.

Feb. 24, 1931. T. M. CONDON 1,793,777
GASOLINE RELEASING DEVICE FOR AEROPLANES
Filed Sept. 28, 1929  2 Sheets-Sheet 2
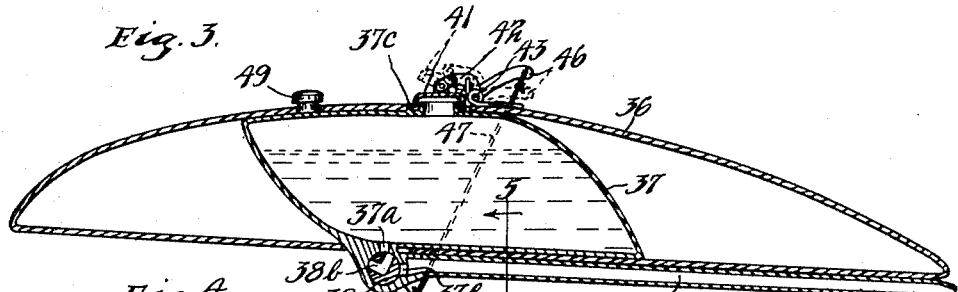
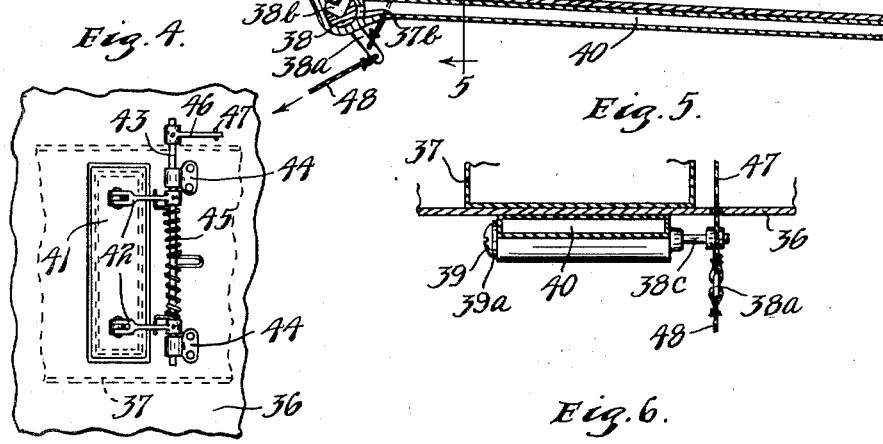
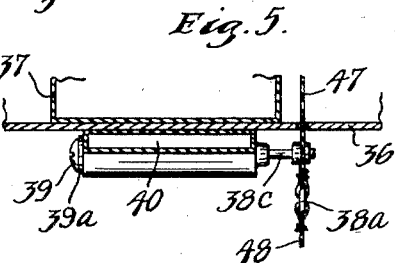
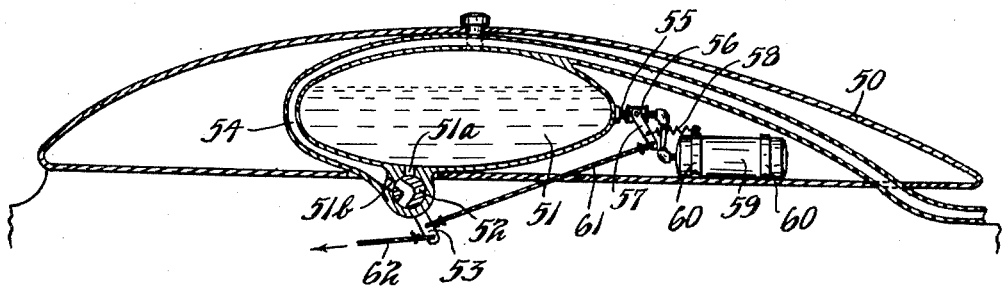
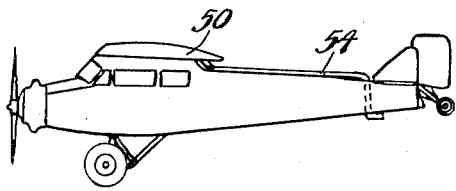
INVENTOR.
T. M. CONDON.
BY HIS ATTORNEYS.

Patented Feb. 24, 1931

1,793,777

UNITED STATES PATENT OFFICE

THOMAS M. CONDON, OF VALLEY CITY, NORTH DAKOTA

GASOLINE-RELEASING DEVICE FOR AEROPLANES

Application filed September 28, 1929. Serial No. 395,814.

This invention relates to an air craft, particularly an aeroplane and the same is especially directed to means for releasing and discharging the fuel from the fuel tank when the air craft falls. As is well known, the greatest damage, as well as injury to persons and loss of life is often caused by the aeroplane catching fire after a crash. The burning of the aeroplane is usually caused by the highly inflammable fuel contained in the fuel storage tank.

It is an object of this invention to provide means whereby when an aeroplane gets out of the control of the pilot and starts to fall the pilot can release the gasoline in the fuel tank so that it will be discharged before the aeroplane reaches the ground.

It is another object of the invention to provide an air craft or aeroplane having a fuel tank, said tank being provided with an opening in its bottom normally closed by a manually operable valve and means connected to a valve whereby the operator can open the valve after the machine starts to fall.

It is still another object of the invention to provide such a device as set forth in the preceding paragraph, an air inlet valve being also provided at the top of the tank which can also be opened by the operator when the first mentioned valve is opened.

It is still another object of the invention to provide an air craft or aeroplane having a fuel tank provided with a discharge opening controlled by a manually operable valve together with a conduit leading from said opening and valve to the rear of the machine, which conduit may extend around the front and over the top of the tank.

It is also an object of the invention to provide an aeroplane having a fuel tank with a discharge opening controlled by a manually operable valve together with a source of compressed air which may be controlled so as to deliver compressed air into the tank when the discharge valve is opened and thus force the fuel from the tank.

These and other objects and advantages of the invention will be fully set forth in the following description made in connection with the accompanying drawings, in which like reference characters refer to similar parts throughout the several views, and in which:—

Fig. 3 is a vertical section through the wing of an aeroplane, said wing having a fuel tank therein;

Fig. 4 is a partial view in plan of the structure shown in Fig. 3 showing the top portion of the wing;

Fig. 5 is a vertical section taken on line 5—5 of Fig. 3 as indicated by the arrows;

Fig. 6 is a view similar to Fig. 3 showing a modified structure, and

Fig. 7 is a view in side elevation on a reduced scale showing an aeroplane and the discharge conduit of the fuel tank.

Figure 1:
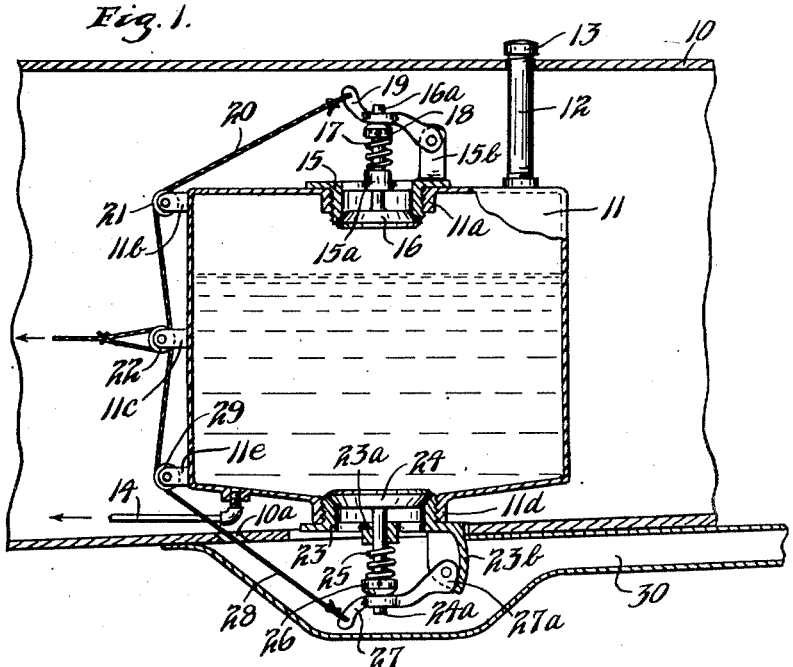
Fig. 1 is a vertical section through a portion of the fuselage of an aeroplane and the fuel tank thereof.

Referring to the drawings in Fig. 1 a portion of an aeroplane is shown including the bottom, top and side walls 10 of the fuselage, in which is supported the fuel supply tank 11. This tank is shown as having a pipe 12 extending upwardly therefrom through the top wall of the fuselage and provided with a cap 13. Pipe 12 constitutes a filling pipe and cap 13 can be removed to place gasoline in the tank 11. A pipe 14 is shown as leading from the bottom of tank 11 and extending forwardly, which pipe will be connected to the carbureter of the aeroplane motor.

In accordance with the present invention, tank 11 is provided at its top with a hub 11a having a threaded opening therein and while said hub could be variously secured to the tank, in the embodiment of the invention illustrated it is shown as being formed integral with the top wall of the tank. A valve casing 15 is provided having a threaded cylindrical portion which is screwed into the hub 11a, said casing having a flange engaging the top of the tank. If desired, a gasket can be inserted between this flange and the top of the tank. Casing 15 has a central hub 15a carried on arms extending across the central opening therethrough and said hub is bored to receive and form the guide for a valve stem 16a connected to the conical plate valve 16. Valve 16 has a frusto-conical surface engaging a similar surface formed on the inner and lower end of casing 15. A coiled compression spring 17 surrounds the stem 16a bearing at one end on the hub 15a and at its other end against a collar 18 pinned to the stem 16a. Casing 15 has a small bracket 15b upstanding at one side thereof to which is pivoted one end of a lever 19 apertured at its central portion to embrace the stem 16a and bear on the top of collar 18, the top of said collar being somewhat beveled or rounded. A cable 20 is secured to the outer end of lever 19 and extends forwardly and downwardly, the same running over a pulley 21 carried in a small bracket or lug 11b projecting from one side of tank 11. Cable 20 also runs over a portion of a double pulley 22 carried on a small bracket or lug 11c projecting from the front wall of tank 11 between the top and bottom thereof, cable 20 extending forwardly from pulley 22. The tank 11 is also provided with an internally threaded hub 11d at its bottom in which is screwed an exteriorly threaded cylindrical portion of a valve casing 23, said valve casing also having a flange engaging the bottom of hub 11d. A gasket may be disposed between the flange of casing 23 and the bottom of hub 11d if desired. The casing 23 has a central hub 23a bored to receive and form the guiding means for a valve stem 24a secured to a valve 24 disposed within the tank 11 and having a frusto conical surface engaging a similar surface on the inner end of casing 23. A coiled compression spring 25 surrounds stem 24a bearing at one end against hub 23a and at its other end against a collar 26 pinned to the stem 24a having a lower rounded or beveled end. Casing 23 has a depending bracket forming a flange 23b between the side portions of which is pivoted a lever 27, said lever having an end portion 27a adapted to engage bracket 23b to limit the downward movement of the lever. Said lever has a central apertured portion for embracing stem 24a and bearing against the lower side of collar 26. The outer end of lever 27 is connected to a cable 28 extending upwardly and forwardly through an aperture 10a in the bottom wall of the fuselage and over a pulley 29 carried on the bracket or lug 11e projecting from the front wall of tank 11. Cable 28 passes from pulley 29 up over the top of pulley 22 and passes forwardly from pulley 22 being secured to cable 20. A conduit 30 is secured to the bottom of the fuselage 10 having an enlarged forward portion enclosing lever 27 and the parts thereabove, said conduit passing rearwardly beneath the fuselage and to a point adjacent the rear end thereof, said conduit having an open discharge end.

In the operation of the structure shown in Fig. 1 and the normal operation of the plane the parts will be in the position shown in Fig. 1. Cable 20 will be carried to a position which will be located for convenient manipulation by the pilot. Should the aeroplane start to fall, the pilot will pull on cable 20 which will operate lever 19 and depress stem 16a against the tension of spring 17 thus opening valve 16. Cable 28 will simultaneously be pulled upon and this will swing lever 27 and raise valve 24, thus opening said valve. The gasoline will now pass out around valve 24 and pass rearwardly through conduit 30 and be sprayed into the air. The opening through the valve casing 23 is quite large so that the gasoline will be sprayed out in a very short interval. The gasoline will thus be all emptied from the tank before the aeroplane crashes and there will be small chance of the aeroplane catching fire after the crash.

Figure 2:
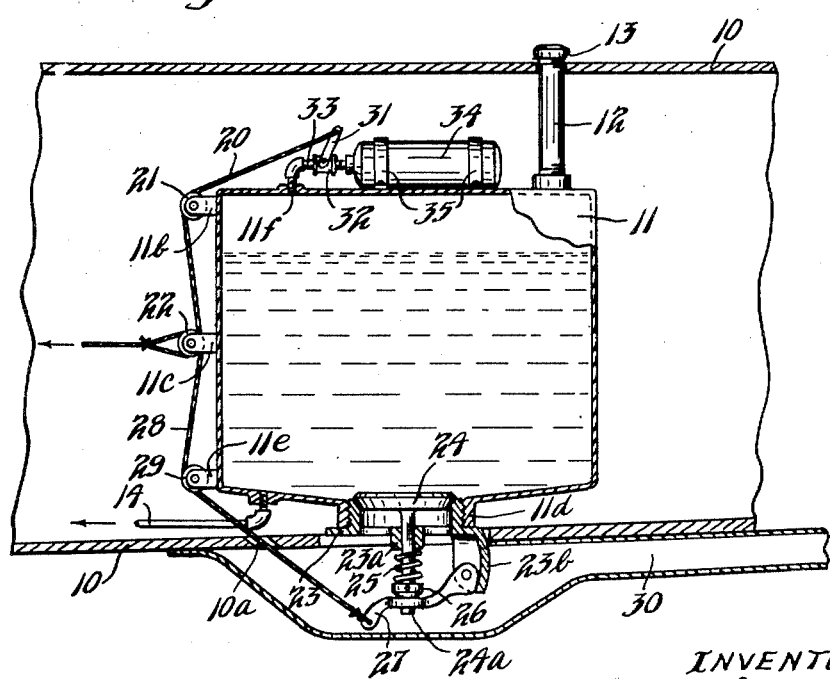
Fig. 2 is a view similar to Fig. 1 showing a modified structure.

In Fig. 2 a slightly modified form of the invention is shown. This form has all the parts shown in Fig. 1 except the valve 16 and cooperating parts at the upper portion of tank 11. In this form the cable 20 is attached at its upper end to a valve operating arm 31 of a valve 32 disposed in a pipe 33 extending into an air inlet opening 11f in tank 11. A cylinder 34 is secured to the top of tank 11 by the straps 35. The tank 34 will contain highly compressed air, or other gas.

In the operation of the device shown in Fig. 2, when the aeroplane starts to fall and the operator pulls upon cable 20 lever 27 will be operated as already described to open the discharge valve 24. At the same time arm 31 of valve 32 will be operated and the compressed air in tank 34 will rush into tank 11 thus supplying air for the space occupied by the fuel and forcing the fuel out at the opening at valve 24. The gasoline will thus be emptied before the aeroplane crashes and the danger of fire will be practically eliminated.

In the modification shown in Fig. 3 a wing 36 of an aeroplane is shown in vertical section, a tank 37 for fuel such as gasoline being provided within the wing 36. Said tank 37 is shown as having a discharge opening 37a at its bottom, said tank having an enlargement extending through an opening in the bottom of a wing 36. An oscillating cock or valve 38 is disposed in a bore in said enlargement and adapted for movement about a horizontal axis, the same having a stem 38c journaled in and projecting from one end of said enlargement, said stem being turned by an arm 38a secured thereto. A screw 39 extends through one end of said enlargement and axially into valve 38, the same over-lying a washer 39a at one end of said enlargement. The discharge opening 37a communicates with the bore in which valve 38 is disposed and said enlargement has another rearwardly extending opening 37b. Cock 38 has an angular passage 38b therethrough, the arms of which may be positioned to register respectively with openings 37a and 37b. A conduit 40 is shown as connected to the lower enlarged portion of tank 37, which conduit extends to the rear of the wing where it has an open end. Tank 37 has an apertured rectangular projection at its upper end extending through the top of wing 36, the same having a rectangular groove 37c adapted to contain a packing material. A closing member or valve 41 has a downwardly turned flange adapted to fit in said groove and engage the packing material therein. Said member 41 is pivotally connected to a pair of arms 42 secured to a pivot rod 43 journaled in bearings 44 secured to the top of wing 36 as shown in Fig. 4. A torsion spring 45 surrounds rod 43 having its central portion engaging the top of wing 36 and its end portions engaging the arms 42. An arm 46 is secured to one end of rod 43 to which is attached a cable 47 extending to and attached to arm 38a. A cable 48 is secured to the end of arm 38a and extends to a position where it is adapted for convenient operation by the pilot. The fuel tank 37 has a filling nozzle 49 at its upper end extending through the plate and having a removable cap thereon.

In the operation of the structure shown in Figs. 3 to 5, the parts will normally occupy the position shown in said figures. When the aeroplane begins to fall, the pilot will pull upon cable 48 in the direction indicated by the arrow in Fig. 3 and this will swing valve 38 so that its passage 38b communicates with passages 37a and 37b. The fuel in tank 37 can now discharge through valve 38 and into conduit 40. At the same time cable 47 will operate arm 46 and arms 42 and member 41 will be raised upwardly substantially to the position shown in dotted lines in Fig. 3. Air will thus be admitted to the top of tank 37 and the motion of the aeroplane will cause a rush of air into the opening in the top of the tank as the air will be deflected by valve 41 into said opening. This will assist in discharging the fuel from the tank. The openings 37a and 37b are of considerable length and the fuel will be quickly discharged.

In Fig. 6 a further modification is shown, a wing 50 of an aeroplane being shown in vertical section. A fuel tank 51, shown as elliptical in cross section is disposed within the wing, said fuel tank having an enlargement in its bottom extending through an opening in the bottom of the wing in which is journaled for oscillation a valve 52 similar in all respects to valve 38 above described and having an operating arm 53. Tank 51 has a downwardly extending opening 51a communicating with a bore through said enlargement and an opening 51b extends from said bore forwardly and upwardly and communicates with a conduit 54 which extends around the forward end of tank 51 and over the top thereof and then rearwardly to the rear of the plane where it has an open end. This conduit is shown in Fig. 7 as extending rearwardly over the top of the fuselage, then downwardly and rearwardly at the bottom of the fuselage. Tank 51 has an air inlet opening at one end thereof with which communicates a pipe 55 having therein a valve 56 provided with an operating arm 57 normally held in a position to close said valve by a tensile spring 58 secured thereto and to the top of a tank 59 secured to the bottom of the wing by straps 60. Pipe 55 communicates with the end of tank 59. A cable 61 extends from the end of arm 57 to the end of arm 53 and a cable 62 extends from arm 53 forwardly to a position adapted to be conveniently reached by the pilot.

When the aeroplone starts to fall, the pilot will pull upon cable 62. This will swing valve 52 so that the opening therein communicates with openings 51a and 51b. At the same time arm 57 will be moved and valve 56 opened. Tank 59 contains highly compressed air and this air will rush into tank 51 replacing the space occupied by the fuel or gasoline and forcing the same from said tank. The aeroplane in falling will be moving substantially nose downward and pipe 55 will be at the top of the tank. The conduit 54 will thus be disposed so that the fuel will move easily therethrough. The conduit 54 shown as disposed can be used when merely a gravity feed is used for the aeroplane and there is no pressure on the fuel. Most aeroplanes now use pressure feed. By having the conduit 54 extend around the front and over the top of the tank, if a gravity feed is used, the opening in the bottom of tank 59 would normally communicate with the conduit 54. If the aeroplane looped-the-loop, the fuel would run back into the tank from conduit 54 and would thus not be lost.

From the above description it is seen that applicant has provided quite a simple and very efficient apparatus whereby the fuel can be emptied from an aeroplane before the same makes a forced landing or crashes. As above stated, with such a device, the danger of fire is practically eliminated. The apparatus can be installed on either new planes or those now in use without great expense. It will be apparent that the apparatus will have great utility for the purpose intended.

It will, of course, be understood that various changes may be made in the form, details, proportions and arrangement of the parts, without departing from the scope of applicant's invention, which, generally stated, consists in a device capable of carrying out the objects above set forth, in the novel parts and combinations of parts disclosed and defined in the appended claims.

What is claimed is:—

1. An aeroplane structure including a fuel tank, said tank having a discharge opening at its bottom, a valve normally closing said opening, mechanism for moving said valve to open position, said tank having an air inlet opening at its upper portion, a valve normally closing said air inlet opening, means normally urging said last mentioned valve to closed position, means disposed without said tank connecting said valves for simultaneous operation and means extending into a position for convenient manipulation by the pilot for operating said last mentioned means for positively and simultaneously opening both valves.

2. An aeroplane structure including a fuel supply tank having a discharge opening at its bottom, a valve beneath said opening and a conduit leading from said valve, said valve being adapted to close said opening and to be moved to a position to effect communication between said opening and conduit, said conduit extending from the under side of said tank around the front thereof, over the top of said tank and rearwardly to the rear portion of said aeroplane and means for operating said valve disposed in position for convenient manipulation by the operator.

3. An aeroplane structure including a fuel supply tank having a discharge opening adjacent the bottom thereof, a valve associated with said opening and a conduit leading from said valve, said conduit extending from the under side of said tank, around the front thereof, over the top of said tank and rearwardly and downwardly, means for supplying a gaseous medium under pressure to the upper portion of said tank, a valve for controlling said means and means for simultaneously operating both of said valves disposed in position for convenient manipulation by the operator.

In testimony whereof I affix my signature.

THOMAS M. CONDON.